(12) United States Patent
Renault et al.

(10) Patent No.: US 11,885,283 B2
(45) Date of Patent: Jan. 30, 2024

(54) AIRCRAFT SEAL

(71) Applicant: Safran Nacelles, Gonfreville l'Orcher (FR)

(72) Inventors: Cédric Renault, Moissy Cramayel (FR); Arnaud Bonny, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 61 days.

(21) Appl. No.: 17/582,156

(22) Filed: Jan. 24, 2022

(65) Prior Publication Data

US 2022/0145830 A1    May 12, 2022

Related U.S. Application Data

(63) Continuation of application No. PCT/FR2020/051307, filed on Jul. 20, 2020.

(30) Foreign Application Priority Data

Jul. 22, 2019  (FR) ...................................... 19/08303

(51) Int. Cl.
  *F02K 1/80* (2006.01)
  *B64D 29/00* (2006.01)
  *B64D 29/08* (2006.01)
  *F02K 1/62* (2006.01)

(52) U.S. Cl.
  CPC .............. *F02K 1/805* (2013.01); *B64D 29/00* (2013.01); *B64D 29/08* (2013.01); *F02K 1/62* (2013.01)

(58) Field of Classification Search
  CPC ........ F16J 15/027; F16J 15/061; F16J 15/062; F02K 1/72; F02K 1/805; F05D 2240/55; F05D 2220/323
  See application file for complete search history.

(56) References Cited

U.S. PATENT DOCUMENTS 6,161,839 A * 12/2000 Walton ................... F16J 15/062
                                                       277/530
8,635,851 B2 * 1/2014 Vauchel ................... F02K 1/70
                                                       244/110 B (Continued)

FOREIGN PATENT DOCUMENTS

FR        2920215        2/2009
FR        2999239 A1 *   6/2014  ............. B64D 29/08

(Continued)

OTHER PUBLICATIONS

International Search Report for International Application PCT/EP2020/051307, dated Jan. 14, 2021.

*Primary Examiner* — Craig Kim
(74) *Attorney, Agent, or Firm* — Burris Law, PLLC

(57) ABSTRACT

A seal interposed between a turbojet engine and a movable part of a nacelle includes a tubular body delimiting an inner cavity interposed between at least one fixing part and a platform. The platform includes a first lateral edge, a second lateral edge and a planar surface extending from the first lateral edge to the second lateral edge. The seal includes a protuberance arranged on the platform. The protuberance is centered on the platform or extends from the first lateral edge to the second lateral edge.

13 Claims, 5 Drawing Sheets

(56) References Cited

U.S. PATENT DOCUMENTS

| | | | | |
|---|---|---|---|---|
| 8,936,249 | B2* | 1/2015 | Swensen | F16J 15/0893 |
| | | | | 277/645 |
| 9,670,874 | B2* | 6/2017 | Provost | F01D 11/005 |
| 2006/0220328 | A1 | 10/2006 | Deaver | |
| 2010/0044466 | A1* | 2/2010 | Vauchel | F02K 1/70 |
| | | | | 239/265.11 |
| 2011/0024994 | A1* | 2/2011 | Bunel | F16J 15/027 |
| | | | | 277/637 |
| 2016/0222916 | A1* | 8/2016 | Provost | F02K 1/566 |
| 2019/0338662 | A1* | 11/2019 | Ratajac | F01D 11/003 |
| 2021/0404417 | A1* | 12/2021 | Renault | F02K 1/805 |

FOREIGN PATENT DOCUMENTS

| | | | | |
|---|---|---|---|---|
| FR | 3018329 | | 9/2015 | |
| FR | 3018329 A1 * | | 9/2015 | F16J 15/027 |
| FR | 3070466 A1 * | | 3/2019 | B64D 29/06 |
| FR | 3099221 A1 * | | 1/2021 | B64D 29/00 |
| WO | 2015036717 | | 3/2015 | |
| WO | WO-2015036717 A1 * | | 3/2015 | B64D 29/00 |
| WO | WO-2015132541 A1 * | | 9/2015 | F16J 15/027 |
| WO | WO-2017216468 A1 * | | 12/2017 | F16J 15/027 |
| WO | WO-2020094972 A1 * | | 5/2020 | F02K 1/72 |
| WO | WO-2021014085 A1 * | | 1/2021 | B64D 29/00 |

* cited by examiner

AIRCRAFT SEAL

CROSS-REFERENCE TO RELATED APPLICATIONS

This application is a continuation of International Application No. PCT/FR2020/051307, filed on Jul. 20, 2020, which claims priority to and the benefit of FR 19/08303 filed on Jul. 22, 2019. The disclosures of the above applications are incorporated herein by reference.

FIELD

The present disclosure relates to a seal configured to provide sealing between a fixed part and a movable part such as between a turbojet engine and a nacelle of an aircraft.

BACKGROUND

The statements in this section merely provide background information related to the present disclosure and may not constitute prior art.

An aircraft is propelled by one or more turbojet engines each housed in a nacelle. Each nacelle also accommodates a set of ancillary actuation devices linked to its operation and providing various functions when the turbojet engine is in operation or stopped.

As shown in FIG. 1, a nacelle generally has a tubular structure comprising an air inlet 16 in front of a turbojet engine 14, a middle section 18 configured to surround a fan of the turbojet engine 14, a rear section 20 which may optionally carry thrust reversal means and is configured to surround the combustion chamber of the turbojet engine 14, and an ejection nozzle 22, whose outlet is located downstream of the turbojet engine.

Modern nacelles are often configured to house a bypass turbojet engine capable of generating, via the blades of the rotating fan, a flow of hot air (also called primary flow) coming from the combustion chamber of the turbojet engine. A nacelle generally has an outer structure, called Outer Fixed Structure (OFS), which defines, with a concentric inner structure, known as the Inner Fixed Structure (IFS), including a cowl surrounding the structure of the turbojet engine itself behind the fan, an annular flow channel, also called flow path, aiming at channeling a flow of cold air, called secondary flow, which circulates outside the turbojet engine. The primary and secondary flows are ejected from the turbojet engines from the rear of the nacelle.

Each propulsion unit of the aircraft is thus formed by a nacelle and a turbojet engine, and is suspended from a fixed structure of the aircraft, for example under a wing or on the fuselage, by means of a pylon or of a mast attached to the turbojet engine or to the nacelle.

The rear section of the outer structure of the nacelle is usually formed of two cowls (reference 24 in FIG. 1) of a substantially semi-cylindrical shape, on either side of a longitudinal vertical plane of symmetry of the nacelle, and movably mounted so as to be able to be deployed between an operating position and a maintenance position which gives access to the turbojet engine.

The two cowls are generally pivotally mounted about a longitudinal axis forming a hinge in the upper part of the reverser (upper junction line, at 12 o'clock).

The cowls are held in the closed position by means of locks arranged along a junction line located in the lower part (at 6 o'clock).

It can therefore be seen that an aircraft propulsion unit integrates functional sub-units which have relative movements and between which it is desired to manage the sealing.

In particular, it is important that the two cowls which surround the turbojet engine and which delimit the secondary flow path over part of its path channel this secondary flow path without leakage towards the turbojet engine.

It is particularly important to create a sealing barrier between the upstream part of each cowl and the turbojet engine to inhibit any leakage from the secondary flow path towards the turbojet engine. Such a leakage can inhibit the desired performance of the nacelle.

Indeed, the nacelle is designed and dimensioned for a channeled secondary flow path which exerts pressure on its inner structure. On the other hand, the nacelle is not designed to face a scooping of the flow constituting the secondary flow path towards the turbojet engine. A significant scooping can lead to a tearing of the inner structure from the nacelle.

However, the seal between the two cowls and the turbojet engine presents a particular problem.

First of all, the two cowls are each driven by axial and radial movements relative to the turbojet engine.

Then, given the large size of the parts, the two cowls can experience significant movements in operation. A seal interposed between a cowl and the turbojet engine must therefore create a sealing barrier regardless of the relative position of a cowl with respect to the turbojet engine.

In addition, it may be desirable to inhibit the propagation of a possible fire between the parts of a nacelle. The sealing between the parts help to slow down or even inhibit the spread of the fire.

Yet, taking into account the crushing coefficient of the known seals and the amplitude of the displacement which must be sealed, the known seals with a tubular cross section generally in omega may not provide adequate sealing.

Indeed, this type of omega seal should have a diameter incompatible with the space delimited between the cowl and the turbojet engine.

A type of seal with a large amplitude of displacement is known, described and represented in document FR2920215, which makes it possible to provide effective sealing.

To this end, the seal described in document FR2920215 includes a body of generally cylindrical radial section and two flexible lips which extend radially from a generatrix of the cylindrical body.

A type of seal with a large crushing amplitude is also known from prior document WO2015036717, this seal includes a body of generally cylindrical radial section and a protuberance forming a first and second lip radially extending and delimiting an inner cavity.

A drawback of this type of seal appears when the seal is compressed when displacing the movable cowls. In the compressed position, a transverse bias resulting from a pressure difference between the zones situated on either side of the seal is applied to the seal. This transverse bias applied to the seal generates a displacement of the seal which can result in a total tilting of the latter which then no longer provides its sealing function.

SUMMARY

This section provides a general summary of the disclosure and is not a comprehensive disclosure of its full scope or all of its features.

The present disclosure provides improved sealing between a cowl of a rear part of a nacelle and of a turbojet engine in an aircraft propulsion unit when the latter experiences large-amplitude relative displacements.

The present disclosure also reduces the risk of tipping the seal during its compression.

The present disclosure provides a seal configured to be interposed between a turbojet engine and a movable part of a nacelle. The seal comprises a tubular body delimiting an inner cavity interposed between at least one fixing part and one platform. The platform includes a first lateral edge, a second lateral edge and a planar surface extending from the first lateral edge to the second lateral edge.

Such a design allows the seal to form a sealed barrier between the turbojet engine and the movable part of the nacelle in the event of a large-amplitude relative displacement of these two elements and makes it possible to inhibit the seal from tilting during its compression, in particular when a pressure differential between the zones situated on either side of the seal, is present.

Thanks to the seal of the present disclosure, the contact width of the seal is limited to the width of the platform between the two lateral edges and is no longer a function of the crushing of the seal. The contact width is thus independent of the level of compression of the seal, which provides a constant contact surface.

According to one form, the movable part is a cowl of a rear section of a nacelle.

According to another form, the seal comprises a protuberance arranged on the platform.

According to yet another form, the protuberance is centered on the platform.

According to one form, the protuberance extends between the first lateral edge and the second lateral edge of the platform.

According to another form, the protuberance has a summit centered on the platform.

According to yet another form, the protuberance has a convex shape. The shape is convex with respect to the inner cavity.

According to one form, the platform has a stiffness greater than a stiffness of the tubular body. Since the stiffness of the platform does not influence the overall stiffness of the seal, a higher stiffness of the platform makes it possible to increase the resistance to tilting of the seal.

According to another form, the platform has a width comprised between a half of a diameter of the tubular body and a diameter of the tubular body.

According to yet another form, the platform has a width greater than half of the diameter of the tubular body. By diameter is meant the greatest width of the tubular body. This makes it possible to obtain improved sealing of the seal.

According to one form, the tubular body comprises walls having a thickness called the first thickness and the platform has a thickness called the second thickness less than said first thickness.

According to another form, the platform has a thickness twice less (i.e., two times less) than the thickness of the walls of the tubular body.

According to yet another form, the platform is diametrically opposed to at least one fixing part. This configuration makes it possible to take advantage of the elasticity of the tubular body.

According to one form, the platform is part of a so-called first plane and the fixing part is part of a so-called second plane, said first plane and second plane being parallel.

According to another form, the fixing part comprises two lateral tabs configured to be engaged in C-shaped rails.

According to yet another form, the platform and the tubular body are made of the same material.

According to one form, the platform is covered with an anti-friction material.

According to a second form, the present disclosure provides a propulsion unit for an aircraft comprising a nacelle surrounding a turbojet engine. The nacelle comprising an air inlet in front of the turbojet engine, a middle section surrounding a fan of the turbojet engine, a rear section accommodating thrust reversal means, comprising at least one movable cowl. The propulsion unit comprising at least one seal as described above interposed between said movable cowl and said turbojet engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
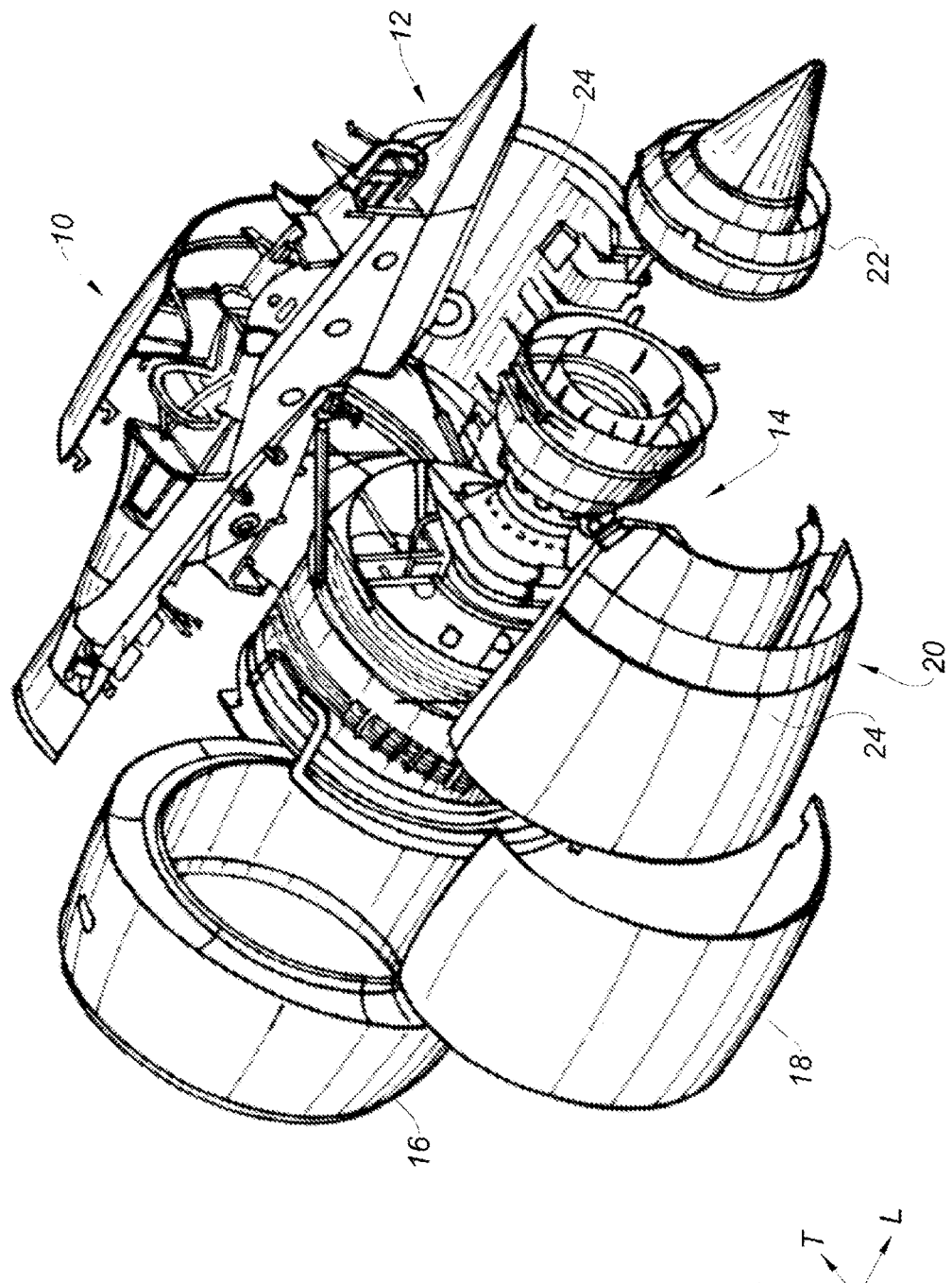
FIG. 1 is an exploded perspective view of an aircraft propulsion unit comprising a nacelle and a turbojet engine of the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For the sake of simplicity, identical elements are identified by identical reference signs in all the figures.

In the description and the claims, the longitudinal, vertical and transverse terminology will be used without limitation with reference to the trihedron L, V, T indicated in the figures.

FIG. 1 represents an aircraft propulsion unit 10 comprising a nacelle 12 and a turbojet engine 14.

The nacelle 12 includes, from upstream to downstream in the direction of air flow, an air inlet 16 arranged in front of the turbojet engine 14, a middle section 18 configured to surround a fan of the turbojet engine 14, a rear section 20 configured to surround the combustion chamber of the turbojet engine 14 and an ejection nozzle 22, whose outlet is arranged downstream of the turbojet engine 14.

The rear section 20 of the nacelle 12 includes two movable cowls 24 which are each equipped with a seal 1 according to the present disclosure.

Figure 2:
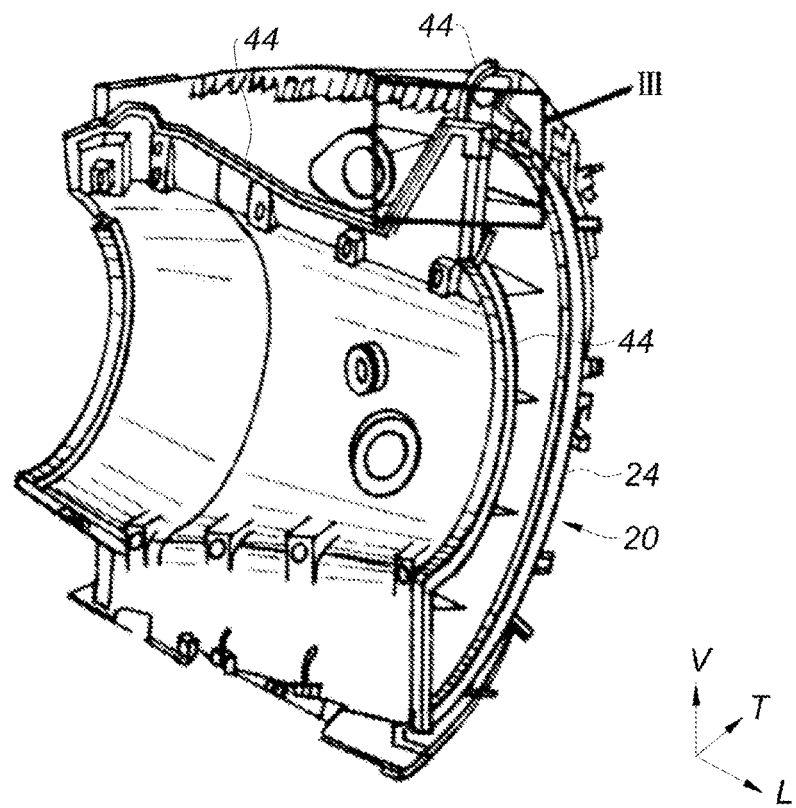
FIG. 2 is a partial perspective view of a rear half section of a nacelle showing the locations of the seals according to the principles of the present disclosure.
Figure 3:
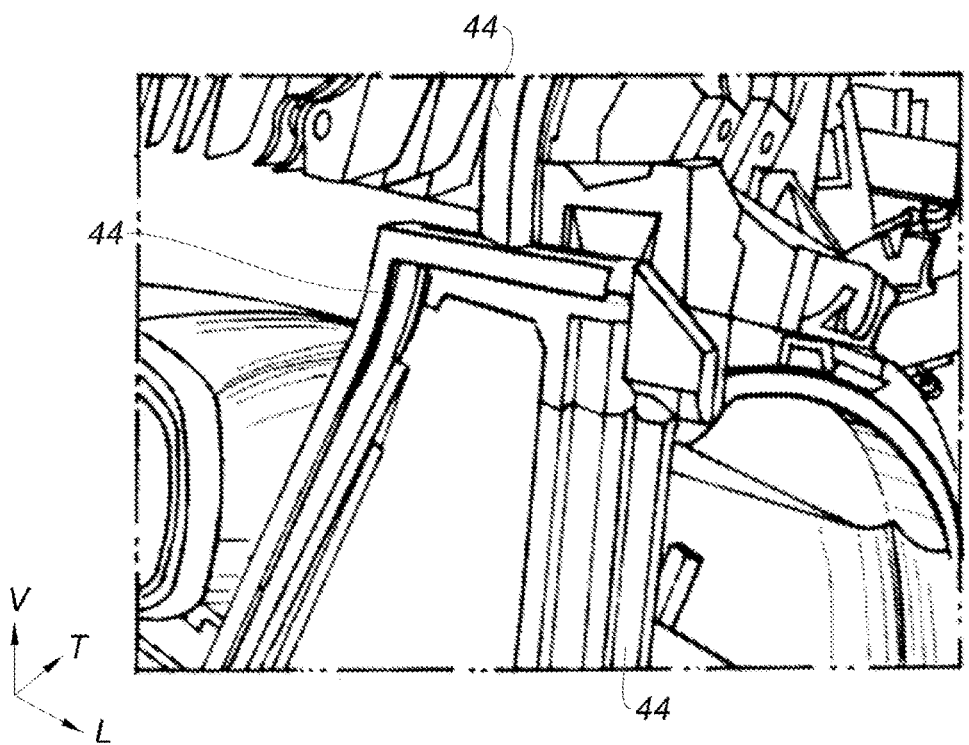
FIG. 3 is an enlarged detail view of the window III of FIG. 2.

Referring to FIG. 2, the seal 1 is configured to be attached and glued to a bearing surface 44 of each rear cowl 24 of the rear section 20 of the nacelle 12.

In operation, the seal 1 which is mounted on each of the cowl 24 comes into contact with the turbojet engine 14 and, more specifically, comes into contact with a casing which surrounds the compressor of the turbojet engine 14. The seal 1 is then overwritten between the cowl 24 on which it is mounted and the casing of the turbojet engine 14.

During operation of the turbojet engine 14, each of the two cowls 24 may experience large amplitude movements in a radial direction but also in an axial direction with respect to the turbojet engine 14.

As an indication, displacements can be noted between a cowl 24 and the turbojet engine 14 whose amplitude can be in the range of 20 millimeters.

The seal 1 according to the present disclosure therefore makes it possible to maintain contact in all circumstances and therefore to create a sealed barrier between the casing of the turbojet engine 14 and the associated cowl 24, even when the radial amplitude is maximum.

Figure 4:
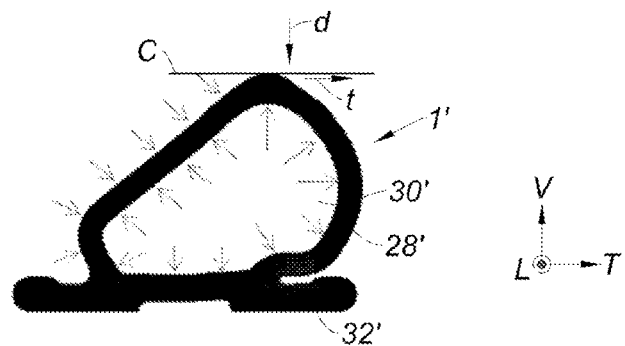
FIG. 4 is a cross-sectional view of a seal of the prior art.

FIG. 4 is a schematic illustration of a seal 1' of the prior art. The seal 1' includes a body 28' with an omega tubular cross section defining an inner cavity 30'.

The seal 1' also comprises a transverse fixing part 32' secured to the tubular body 28'.

FIG. 4 illustrates the problem of the seals of the prior art during their compression by a compressor C corresponding here to the turbojet engine or casing of the turbojet engine.

During the compression of the seal 1' in the direction of the arrow "d", a transverse stress "t" due to a pressure difference between the zones situated on either side of the seal is applied to the seal 1'. This transverse stress "t" induces a displacement of the seal, in particular of the part of the seal opposite to that comprising the fixing part which is not mechanically fixed. The transverse stress "t" can result in a total tilting of the seal which is then no longer in contact with the compressor C and which then no longer performs its sealing function.

Figure 5:
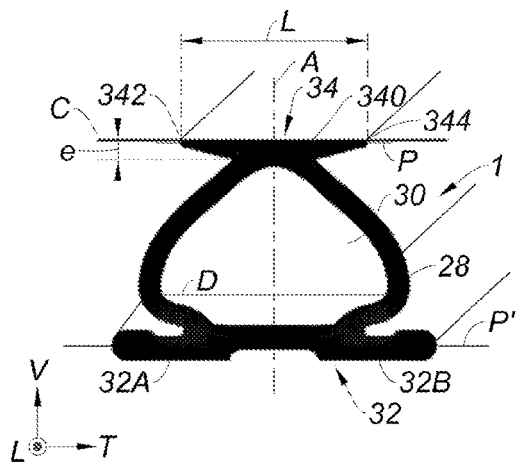
FIG. 5 is a cross-sectional view of a seal according to a first form of the present disclosure.

FIG. 5 is an illustration of a seal 1 according to one form of the present disclosure at rest, that is to say on which no compression is applied.

In the present example, the seal 1 has an axis of symmetry A. The seal 1 includes a tubular body 28 which defines an inner cavity 30.

Figure 6:
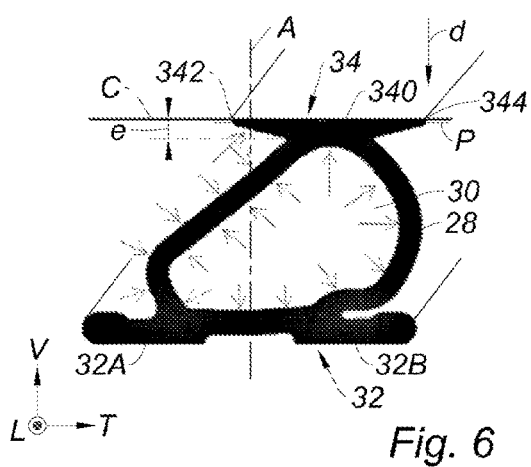
FIG. 6 is a cross-sectional view of the seal of FIG. 5 during its compression.

The tubular body 28 has a radial section of generally circular shape at rest. The tubular body 28 being configured to be deformed by crushing by adopting a substantially ovoid radial section (FIG. 6).

The seal 1 is equipped with a fixing part. In the example of FIGS. 5 to 12, the fixing part comprises a first lateral fixing tab 32A and a second lateral fixing tab 32B arranged on either side of the axis of symmetry A, which are secured to the tubular body 28 and which have a generally rectilinear radial section. These lateral tabs 32A, 32B are configured to be engaged in C-shaped rails.

Figure 13:
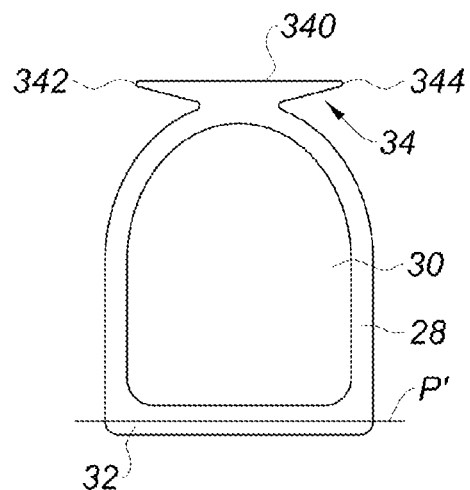
FIG. 13 is a cross-sectional view of another seal according to the principles of the present disclosure.
Figure 14:
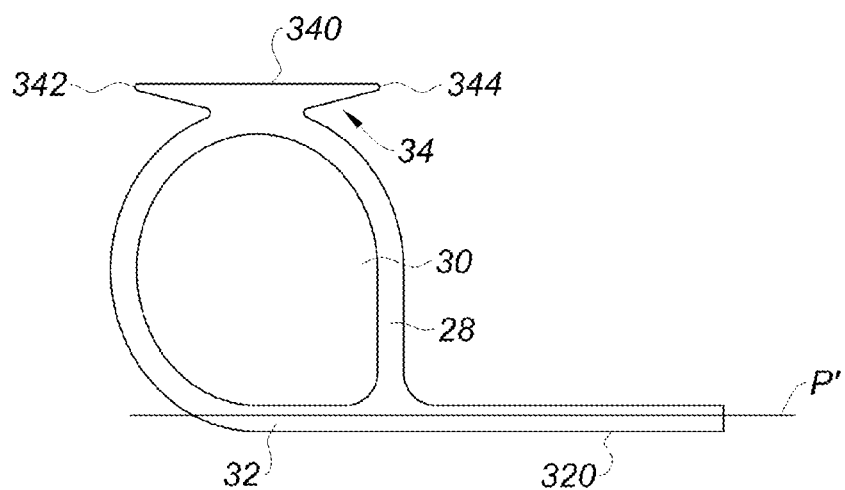
FIG. 14 is a cross-sectional view of another seal according to the principles of the present disclosure.

The fixing part is not limited to lateral tabs and may for example comprise a single planar strip having a dimension substantially identical to the diameter of the inner cavity 30 (FIG. 13) or a single planar strip having one end 320 partially extending from the fixing part 32 (FIG. 14). Those planar strips are configured to be fixed by means known to those skilled in the art, by gluing for example or by riveting, on a bearing surface 44 of each rear cowl 24 of the rear section 20 of the nacelle 12.

In the represented examples, the platform 34 is part of a plane called the first plane P and the fixing part 32 is part of a plane called the second plane P'. The first and second planes are parallel so that the platform and the fixing part are parallel.

Also, the seal 1 includes a platform 34 of surface contact.

The platform 34 has a planar surface 340 extending along the plane P. This planar surface 340 extends from a first lateral edge 342 to a second lateral edge 344 of said platform 34.

The platform 34 has a first face turned towards the inner cavity 30 and a second face, opposite the first face.

In this form, the platform 34 is diametrically opposed to the lateral tabs 32A, 32B. It should however be noted that the seal 1 according to the present disclosure is not limited to this configuration of the platform 34. For this purpose, the platform 34 may not be diametrically opposed to the lateral tabs 32A, 32B.

Preferably, the material used to make the seal is of the silicone type reinforced with fibers, such as glass or aramid fibers for example. Other materials can nevertheless be used for the production of the seal, such as glass, carbon, ceramic or sheet metal plies.

In the present example, the tubular body 28 and the platform 34 are made of the same material, that is to say they are made of the same material.

In a non-represented variant, the tubular body 28 and the platform 34 can be made from different materials.

In the present example, the platform 34 is covered with an anti-friction material, that is to say a material with a low coefficient of friction such as for example a Nomex ply.

The function of the platform is to anchor the seal so as to inhibit the seal from slipping and loss of adhesion of the seal at the level of the compressor C. The platform makes it possible to maintain contact in all circumstances and therefore create a sealed barrier between the casing of the turbojet engine and the cowl.

Thus, thanks to the platform 34, the risk of the seal tilting during compression (FIG. 6) of the latter in the direction of the arrow "d" is reduced.

In addition, the contact width of the seal 1 with the compressor C is constant since it is limited to the width of the platform 34.

The width L of the platform is defined by the distance between the two lateral edges 342, 344.

The contact width is no longer a function of the level of compression of the seal (as seen in the prior art seal 1' of FIG. 4).

Preferably, the stiffness of the platform 34 is greater than the stiffness of the tubular body of said seal so as to increase the resistance to a tilting of the seal 1.

In the present example, the platform 34 has a width L greater than one half of the diameter D of the tubular body.

In an alternative form (not represented), the platform 34 has a width equal to half the diameter of the tubular body 28.

Preferably, the platform 34 will not have a width L greater than the diameter D of the tubular body 28 for reasons of geometric environment. However, this can be the case when the environment allows it.

The platform 34 has a thickness "e" less than twice the thickness of the walls of the tubular body 28.

The thickness of the platform 34 corresponds to the thickness "e" determined at the level of the intersection with the axis of symmetry A.

The platform 34 is configured to be arranged on any type of seal, for example a seal having a height/width ratio greater than 1 (FIGS. 7 to 12).

Figure 7:
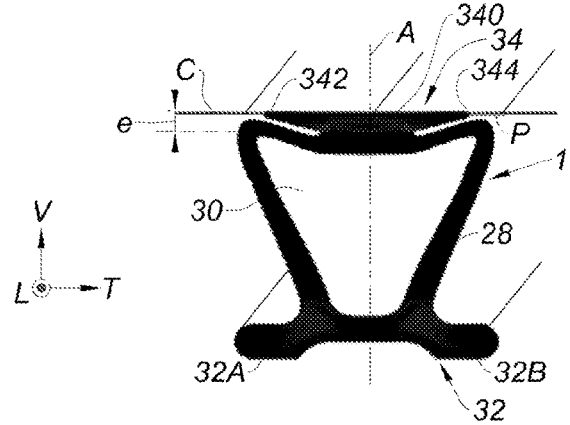
FIG. 7 is a cross-sectional view of another seal in minimum compression.

FIG. 7 represents a seal 1 of the Slim Omega type comprising the platform 34, in a minimum compression state.

Figure 8:
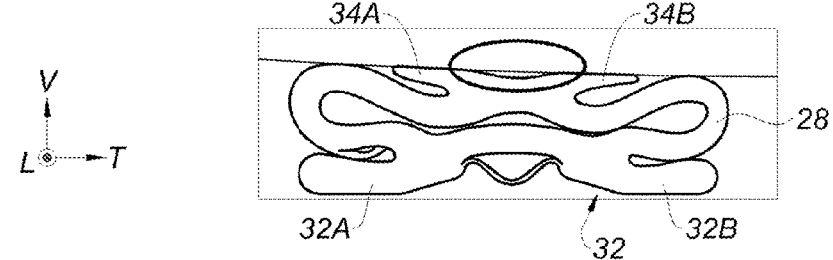
FIG. 8 is a cross-sectional view of the seal of FIG. 7 in maximum compression.

FIG. 8 represents the seal 1 according to FIG. 7 in a maximum compression state. In this state of compression, the platform has two contact surfaces 34A and 34B.

Figure 9:
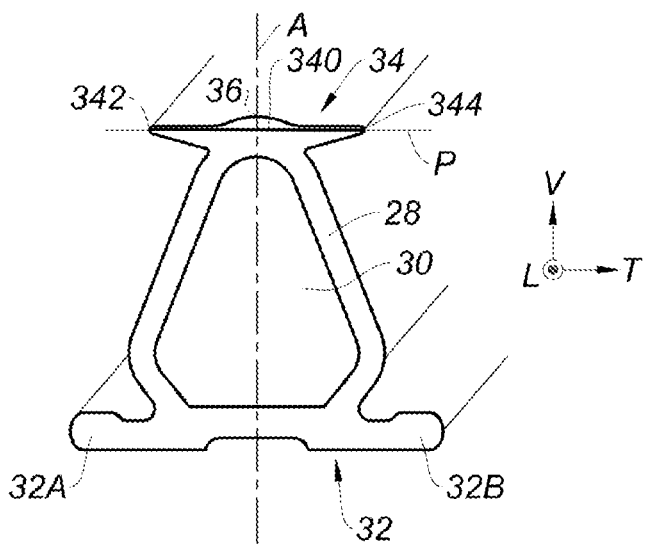
FIG. 9 is a cross-sectional view of a seal according to a second form of the present disclosure.
Figure 10:
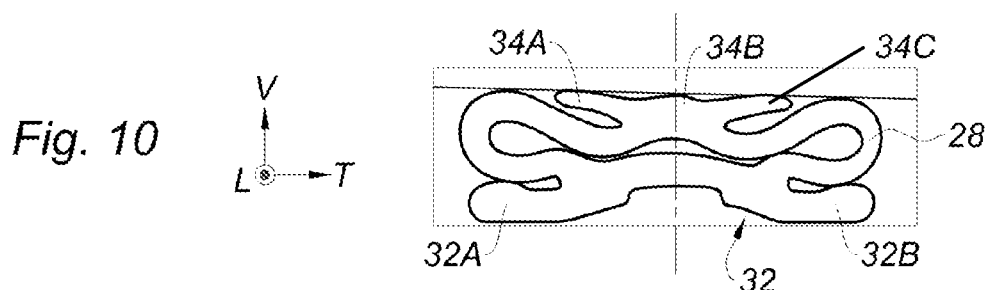
FIG. 10 is a cross-sectional view of the seal according to FIG. 9 in maximum compression.

FIG. 9 represents the seal 1 according to another form of the present disclosure in which the seal comprises a protuberance 36 arranged on the platform 34. The radial section of the platform 34 has a protuberance 36 arranged on the face of the platform 34 opposite to the face facing towards the cavity 30. The protuberance 36 extends from the opposite face, in a direction opposite to the face facing towards the inner cavity 30. Thus, according to this form, the seal comprises the platform 34 having a planar surface from a first edge 342 to a second edge 344, and the seal comprises a protuberance 36 arranged on the platform 34.

In the present example, the protuberance 36 is centered on the axis of symmetry A, that is to say that the protuberance 36 is arranged in the middle of the surface of the platform 34.

In other words, the protuberance 36 is centered on the platform 34.

In a non-represented form, the protuberance can be arranged at a distance from the axis of symmetry A.

In the position of maximum compression (FIG. 10), the platform 34 has three contact surfaces 34A, 34B and 34C.

Figure 11:
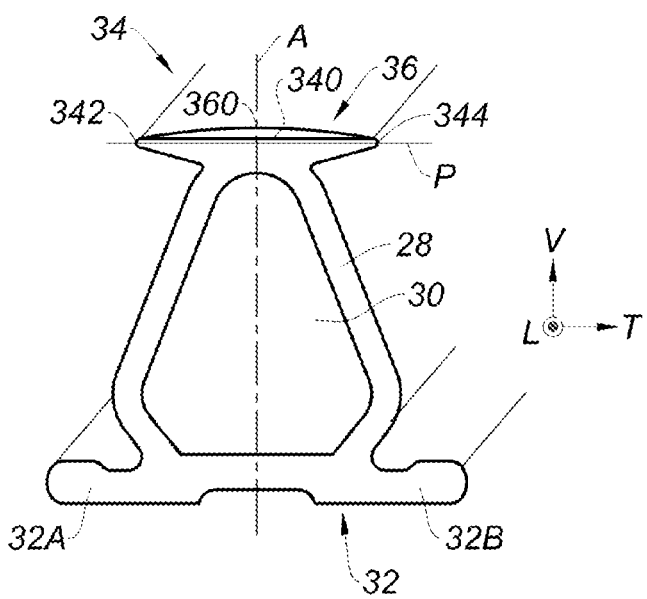
FIG. 11 is a cross-sectional view of another seal.
Figure 12:
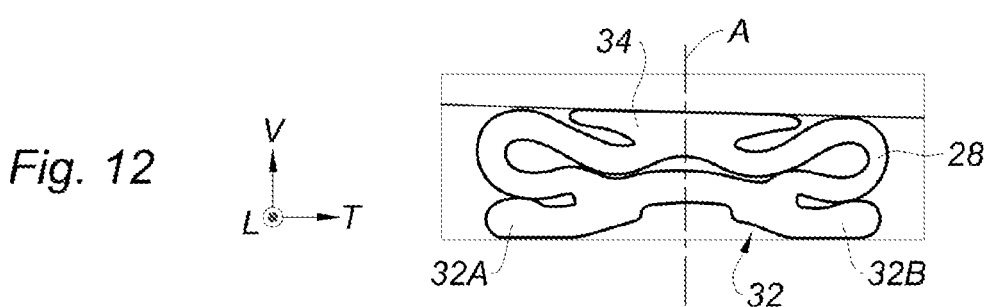
FIG. 12 is a cross-sectional view of the seal of FIG. 11 in maximum compression.

FIG. 11 represents the seal 1 according to another form of the present disclosure in which the protuberance 36 extends between the two lateral edges 342, 344, that is to say that the protuberance 36 extends from the first lateral edge 342 to the second lateral edge 344. The protuberance has a vertex 360 arranged at the intersection with the axis of symmetry A. It can be noted that in this form, the edges 342, 344 have a rounded shape.

The protuberance 36 has a summit 360 centered on the platform 34. In the present example, the protuberance 36 has a convex shape. In the position of maximum compression (FIG. 12), the platform 34 has a single contact surface.

Those skilled in the art will know how to choose the configuration of the platform according to the desired sealing profile.

Of course, the seal is not limited to the examples which have just been described and numerous modifications can be made to these examples without departing from the scope of the present disclosure. In particular, the different characteristics, shapes, variants and forms of the seals can be associated with each other in various combinations as long as they are not incompatible or mutually exclusive. It will then be understood that the geometric shape of the tubular body 28 of the seal 1 is not limited to the examples described above. Likewise, the seal may not have an axis of symmetry.

This seal can also be used in other parts of an aircraft, for example at the level of the pylon, doors or else an IFS.

Thus, by virtue of the seal according to the present disclosure, the seal is improved, the risks of the seal tilting and of loss of sealing are reduced and the manufacture of the seal is simplified.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A seal interposed between a turbojet engine and a movable part of a nacelle, the seal comprising:
    a tubular body delimiting an inner cavity interposed between at least one fixing part and a platform, the platform comprising a first lateral edge, a second lateral edge and a planar surface extending from the first lateral edge to the second lateral edge at least when the seal is at rest, when no compression is applied to the seal,
    wherein the seal comprises a protuberance arranged on the platform.

2. The seal according to claim 1, wherein the protuberance is centered on the platform.

3. The seal according to claim 1, wherein the protuberance extends between the first lateral edge and the second lateral edge.

4. The seal according to claim 3, wherein the protuberance has a summit centered on the platform.

5. The seal according to claim 1, wherein the protuberance has a convex shape.

6. The seal according to claim 1, wherein the platform has a first stiffness greater than a second stiffness of the tubular body.

7. The seal according to claim 1, wherein the platform has a width greater than a half of a diameter of the tubular body.

8. The seal according to claim 1, wherein the tubular body comprises a wall having a first thickness and the platform has a second thickness less than the first thickness.

9. The seal according to claim 1, wherein the platform is covered with an anti-friction material.

10. The seal according to claim 1, wherein the platform is part of a first plane and the at least one fixing part is part of a second plane, the first plane and second plane being parallel.

11. The seal according to claim 10, wherein the at least one fixing part comprises two lateral tabs configured to be engaged in C-shaped rails.

12. The seal according to claim 1, wherein the movable part is a cowl of a rear section of the nacelle.

13. A propulsion unit for an aircraft comprising a nacelle surrounding a turbojet engine, the nacelle comprising:

an air inlet in front of the turbojet engine,
a middle section surrounding a fan of the turbojet engine,
a rear section accommodating thrust reversal means comprising at least one movable cowl,
wherein the propulsion unit comprises at least one seal according to claim 1, the seal interposed between the one movable cowl and the turbojet engine.

\* \* \* \* \*